(12) United States Patent
Poe (10) Patent No.: US 9,386,739 B2
(45) Date of Patent: *Jul. 12, 2016

(54) SYSTEM FOR CONTROLLING MOWER DRIVE WHEELS

(71) Applicant: Swisher Acquisition Inc., Warrensburg, MO (US)

(72) Inventor: Aaron Samuel Poe, Warrensburg, MO (US)

(73) Assignee: Swisher Acquisition, Inc., Warrensburg, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,937

(22) Filed: Sep. 10, 2014

(65) Prior Publication Data

US 2014/0373498 A1 Dec. 25, 2014

Related U.S. Application Data

(63) Continuation of application No. 13/839,466, filed on Mar. 15, 2013, now Pat. No. 8,857,558.

(51) Int. Cl.
  *A01D 34/00* (2006.01)
  *A01D 69/10* (2006.01)

(52) U.S. Cl.
  CPC .............. *A01D 34/006* (2013.01); *A01D 69/10* (2013.01); *Y10T 74/20104* (2015.01)

(58) Field of Classification Search
  CPC .................. A01D 34/006; A01D 69/10; Y10T 74/20104; E02F 9/2004; E02F 9/2012; E02F 9/2079; E02F 9/2083; B60T 7/102; B60T 7/104; F16H 61/36; F16H 59/0278; F16C 1/10; F16C 1/106; G05G 1/04; B60K 2741/24; B60K 2741/26; B60K 41/24; B60K 41/26; F16D 67/02
  USPC ................. 74/473.1, 473.14, 473.15, 473.19, 74/473.2, 473.24–473.26, 473.3, 500.5, 74/501.6, 502.2, 519, 523; 180/315, 336, 180/370–372; 192/220.1, 13 R, 12 R, 13 A
  See application file for complete search history.

(56) References Cited

U.S. PATENT DOCUMENTS 8,857,558 B2 * 10/2014 Poe ............................... 180/315

\* cited by examiner

*Primary Examiner* — Laura Freedman
(74) *Attorney, Agent, or Firm* — Hovey Williams LLP (57) ABSTRACT

A zero-turn-radius mower includes a chassis, a pair of drive wheels for supporting the chassis above a ground surface, an engine, and a pair of transmissions or other drive mechanism for driving the drive wheels. A manually-moveable brake lever enables an operator to selectively brake the drive wheels and a manually-moveable bypass lever enables the operator to selectively engage bypass functions of the transmissions. The brake lever and the bypass lever are mechanically coupled such that engaging the brake lever causes the bypass lever to be engaged with the brake lever, but engaging the bypass lever does not cause the brake lever to be engaged. The brake lever and the bypass lever each including a locking mechanism that retains the respective lever in an engaged position.

19 Claims, 9 Drawing Sheets

SYSTEM FOR CONTROLLING MOWER DRIVE WHEELS

RELATED APPLICATIONS

The present application is a continuation of an earlier-filed U.S. non-provisional patent application titled "SYSTEM FOR CONTROLLING MOWER DRIVE WHEELS", Ser. No. 13/839,466 filed Mar. 15, 2013. The present application claims priority benefit of the above-identified application, and hereby incorporates the identified application by reference in its entirety into the present application.

FIELD

Embodiments of the present invention relate to systems for controlling operation of the drive wheels of zero-turn-radius mowers.

BACKGROUND

A zero-turn-radius or "zero-turn" vehicle is a vehicle with a turn radius that is effectively zero inches. Zero-turn riding lawnmowers can reduce the amount of time required to mow yards and other areas because they can cut closely around trees, fences and other obstacles and therefore reduce or even eliminate the need for trimming. Another advantage of these mowers is that they pivot through 180 degrees without leaving a circle of uncut grass.

Different makes and models of zero-turn riding lawnmowers achieve a zero-turn radius in different ways, but hydraulic speed control of the drive wheels is the most common method. A typical zero-turn mower has each of its drive wheels connected to a separate hydrostatic transmission. A hydrostatic transmission is a continuously variable transmission that creates wheel rotation using pressurized fluid. Rotational force from an engine drives a pump that pressurizes transmission fluid. A steering/speed lever, joystick or other user control device may be moved to control the flow of fluid through each transmission and thus control the rotational speed or the forward/reverse direction of each drive wheel. If one drive wheel turns more rapidly than the other, the mower moves along a curved path. If both wheels turn at the same speed, the mower follows a straight path. If one wheel stops and the other turns, or if the wheels turn in opposite directions, the mower pivots or rotates.

The above section provides background information related to the present disclosure which is not necessarily prior art.

SUMMARY

A mower constructed in accordance with an embodiment of the present invention comprises a chassis, a pair of drive wheels for supporting the chassis above a ground surface, and an engine and a drive mechanism for driving the drive wheels. A manually-moveable brake lever selectively brakes the drive wheels, and a manually-moveable bypass lever selectively bypasses the drive mechanism. The brake lever and the bypass lever are mechanically coupled such that engaging the brake lever causes the bypass lever to be engaged with the brake lever.

A mower constructed in accordance with another embodiment of the present invention comprises a chassis, a pair of drive wheels for supporting the chassis above a ground surface, a seat supported on the chassis, and an engine and a pair of transmissions for driving the drive wheels. A pair of manually-moveable control handles enable control of the transmissions, wherein the control handles are positioned proximate the seat such that an operator seated in the seat can operate the control handles. A manually-moveable brake lever selectively brakes the drive wheels, and a manually-moveable bypass lever selectively engages bypass functions of the transmissions. The brake lever and the bypass lever are mechanically coupled such that engaging the brake lever forces the bypass lever to be engaged with the brake lever, but engaging the bypass lever does not force the brake lever to be engaged. Furthermore, the brake lever and the bypass lever are positioned proximate the seat such that an operator seated in the seat can operate the brake lever and the transmission bypass lever.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A lawnmower 10 constructed in accordance with various embodiments of the invention is illustrated in the drawing figures. The lawnmower 10 may be a zero-turn-radius type lawnmower or any other type of mower with a small turning radius.

Figure 1:
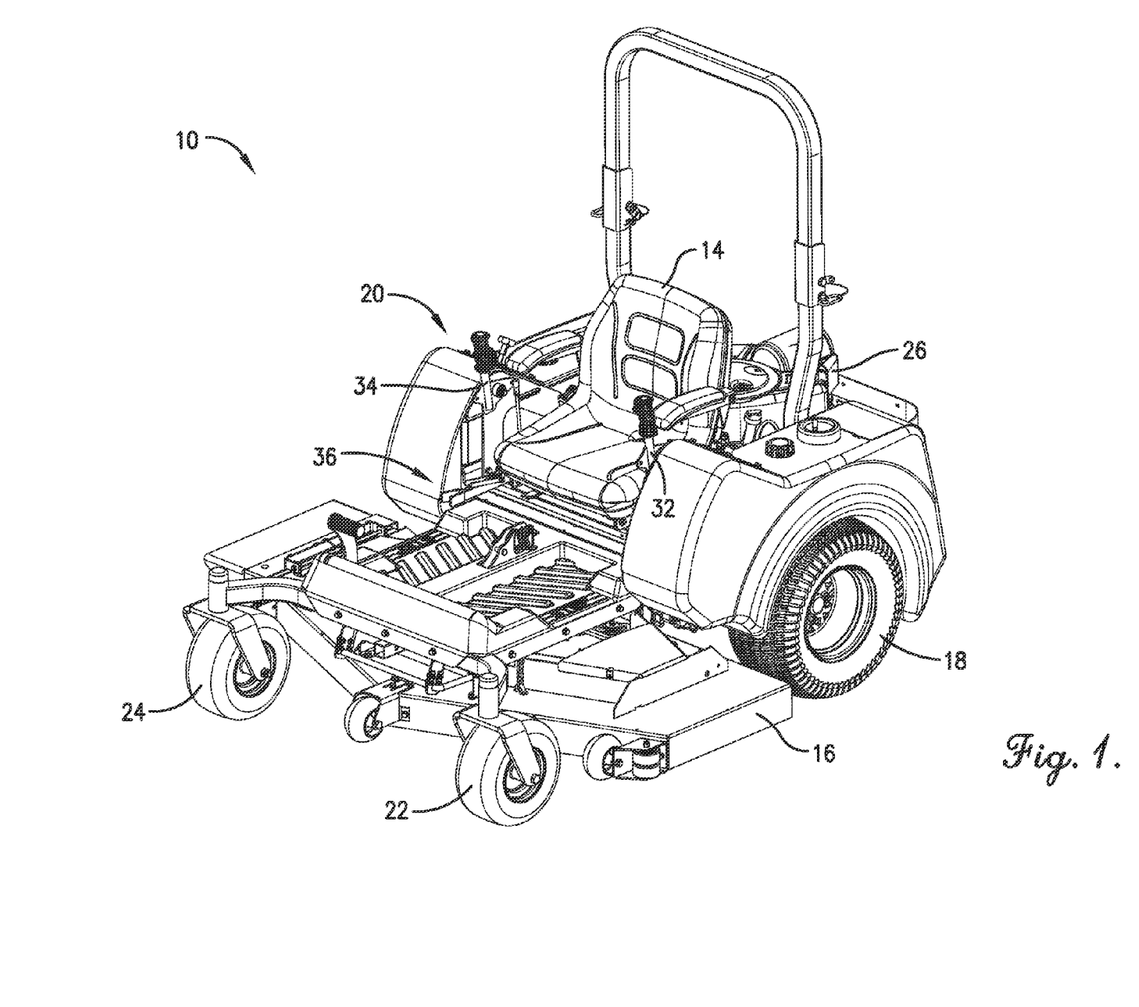
FIG. 1 is a front isometric view of a zero-turn-radius mower including a braking and bypass control assembly constructed in accordance with embodiments of the present invention.
Figure 2:
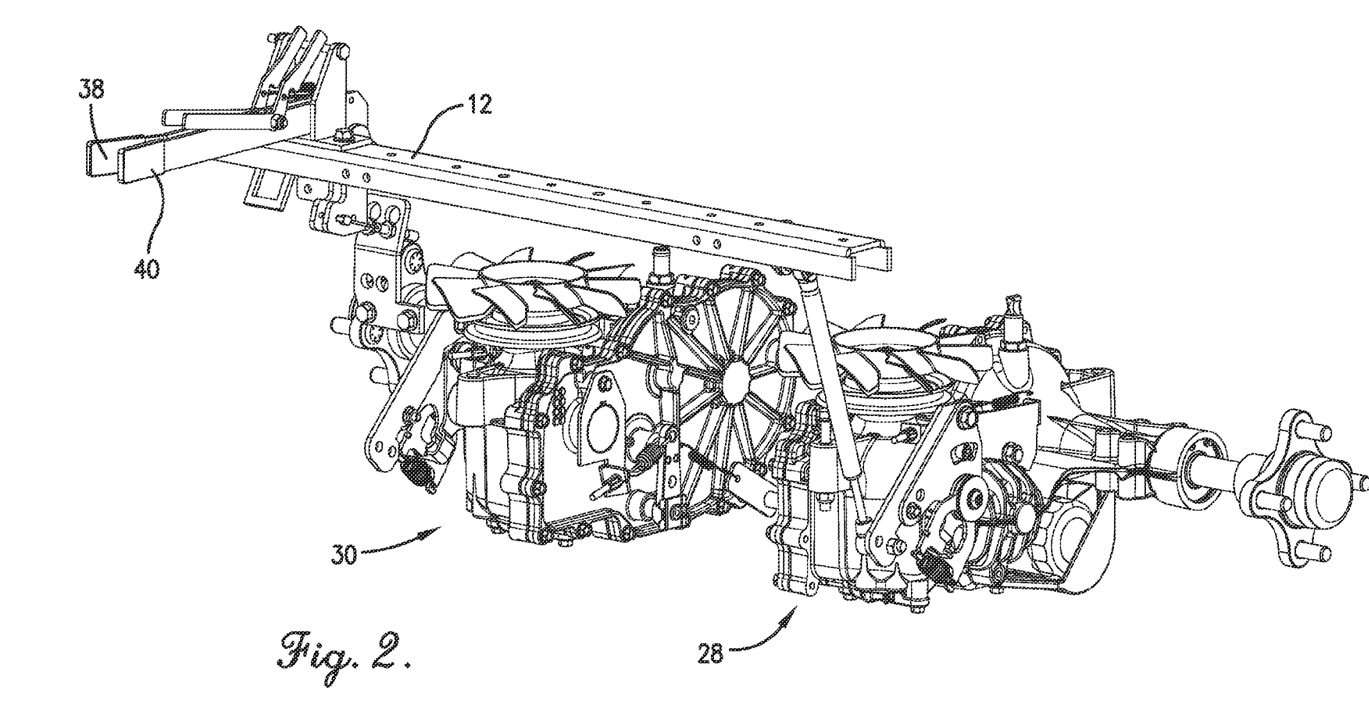
FIG. 2 is a front isometric view of certain components of the mower of FIG. 1 including a pair of transmissions and the braking and bypass control assembly.
Figure 3:
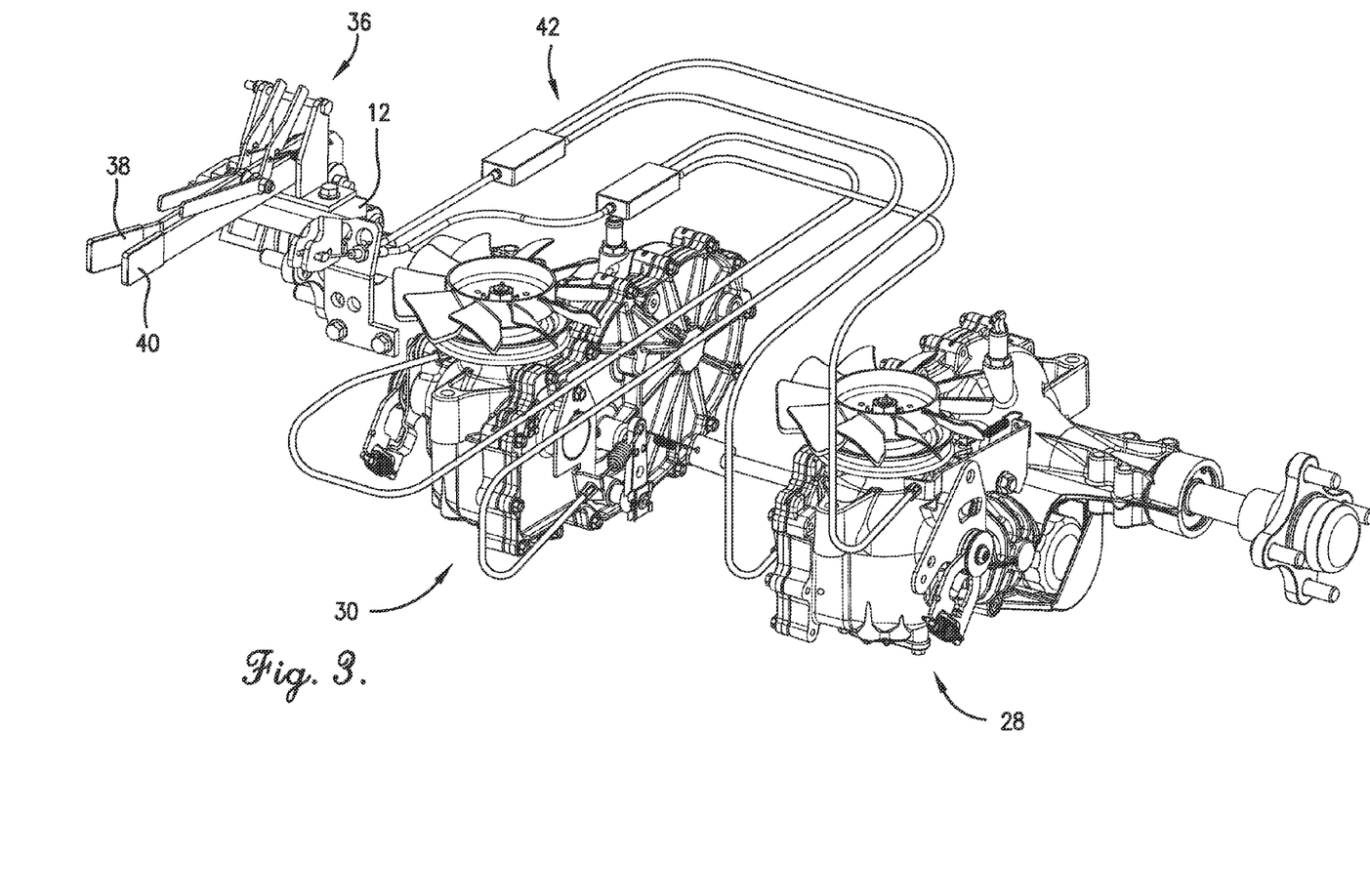
FIG. 3 is a front isometric view of the transmissions and the braking and bypass control assembly of FIG. 2 including a push-pull cable system operably coupling levers of the control assembly with braking and bypass levers on the transmissions.
Figure 4:
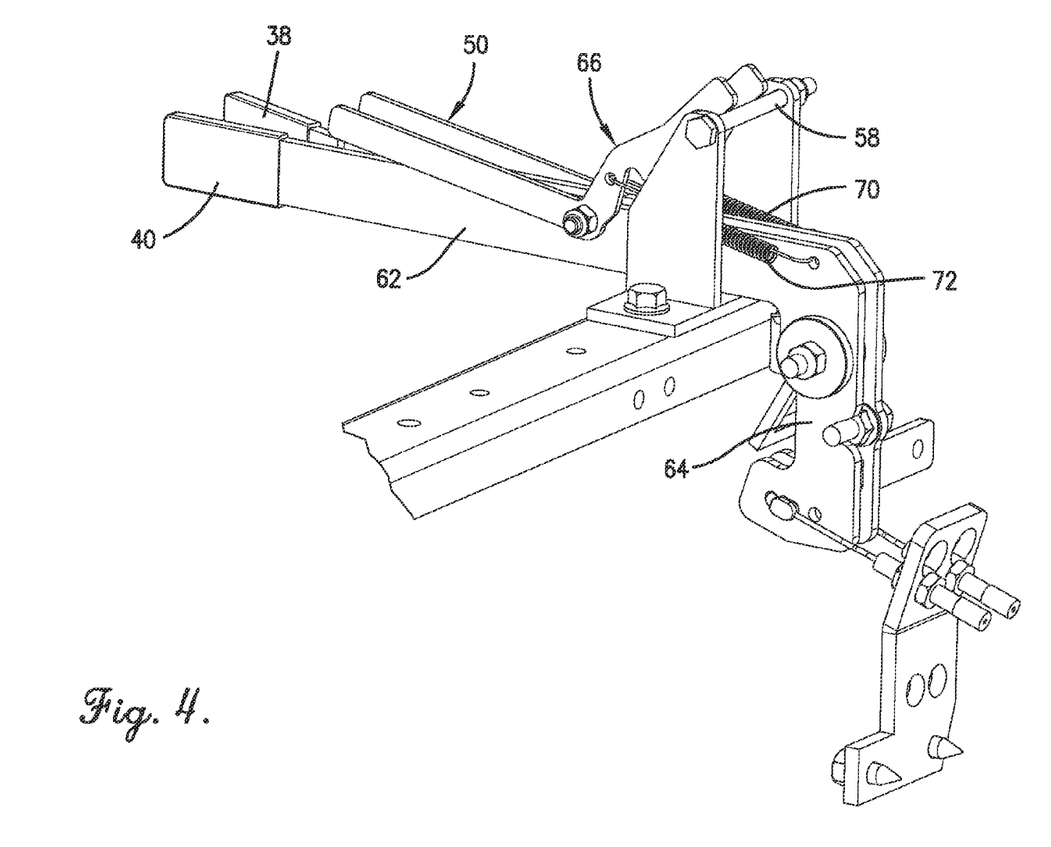
FIG. 4 is a rear isometric view of a brake lever and bypass lever of the braking and bypass assembly, illustrating both levers in an unengaged position.
Figure 5:
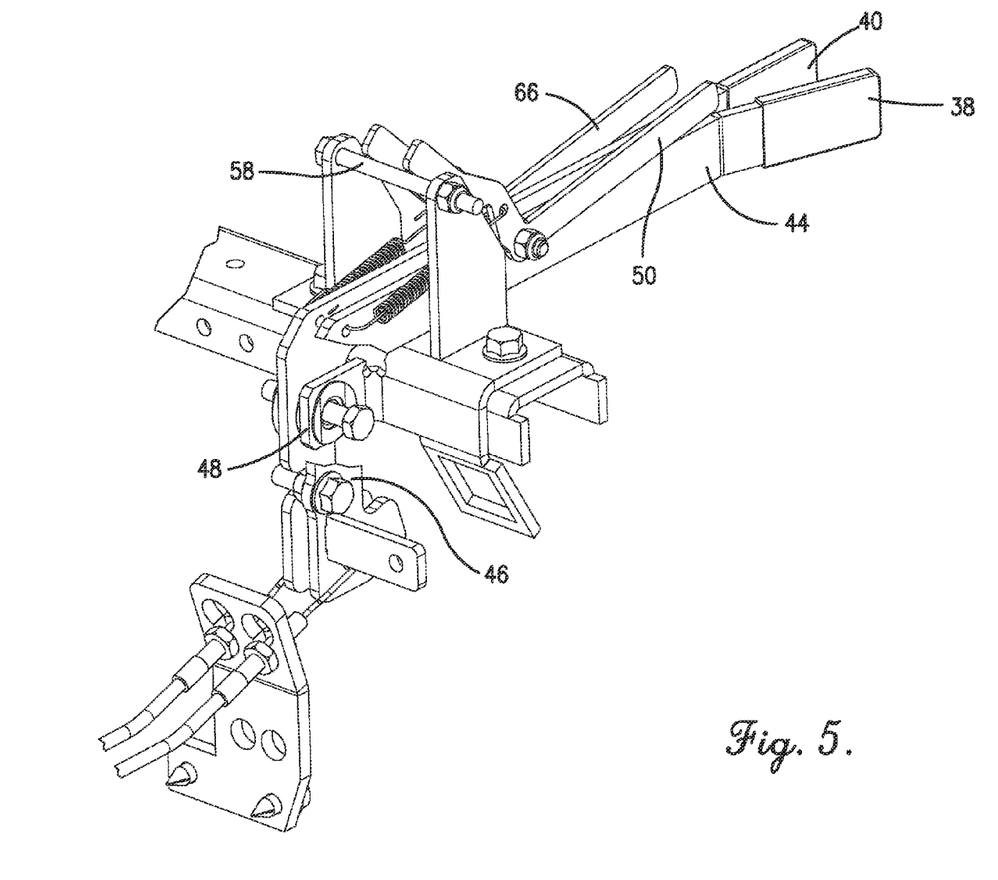
FIG. 5 is a rear isometric fragmentary view of the brake lever and bypass lever illustrating both levers in an unengaged position.

Initially referring to FIGS. 1-3, an embodiment of the mower 10 broadly comprises a chassis 12; a seat 14 supported on the chassis for permitting an operator to sit or stand on the mower; a mower deck 16 with one or more cutting blades notably attached to or supported under the chassis; a pair of drive wheels 18, 20 and a pair of caster wheels 22, 24 for supporting the chassis and mower deck above a ground surface; an engine 26; a pair of transmissions 28, 30 coupled between the engine and the drive wheels for driving the drive wheels; and a pair of manually-moveable drive control handles 32, 34 for controlling the forward and reverse drive functions of the transmissions; and a braking and bypass control assembly 36 including a manually-moveable brake lever 38 for braking the drive wheels and a manually-moveable bypass lever 40 for engaging a bypass function of the transmissions 28, 30.

The chassis 12, seat 14, mower deck 16, drive wheels 18, 20, caster wheels 22, 24, engine 26, and transmissions 28, 30 are conventional and are thus not described in detail herein. Embodiments of the lawnmower 10 may also comprise conventional fuel tanks, body panels, electrical control systems, steering assemblies, batteries, and other components that will also not be described in detail herein. The drive control handles 32, 34 and related components were described in an earlier-filed patent application titled "ZERO-TURN LAWN-MOWER WITH IMPROVED CONTROL HANDLES," filed on Nov. 8, 2012 and assigned application Ser. No. 13/569,602. The earlier-filed patent application is incorporated by reference herein in its entirety.

The braking and bypass control assembly 36 may be installed on any size and type of lawnmower. Thus, the present invention is not limited to the particular mower 10 described and illustrated herein. By way of example, the drive wheels of some mowers may be positioned at the front of the mower or positioned intermediate front and rear caster wheels. The position of the drive wheels is not important to the present invention, which may be implemented in mowers with various different wheel configurations. Furthermore, while the mower 10 includes two transmissions 28, 30, each associated with one of the drive wheels 18, 20, it will be appreciated that the present invention is not so limited and may be used with other types of drive mechanisms. By way of example, the present invention may be used with a mower that includes a single transmission configured to drive both wheels 18, 20, a single hydraulic motor configured to drive both wheels 18, 20, or two hydraulic motors each associated with one of the wheels 18, 20.

The transmissions 28, 30 include levers or other control elements for actuating braking and bypass functions of the transmissions, as discussed below in greater detail. By way of example, the transmissions may be the ZT-2800 model transaxle sold by HYDRO-GEAR®. As used herein, "bypassing" a transmission means allowing the drive wheel associated with the transmission to spin freely without being driven or impeded by the transmission. Thus, bypassing a transmission may involve completely disengaging the associated drive wheel from the transmission or disabling the transmission so that it simply follows movement of the associated drive wheel. In certain embodiments of the invention described and illustrated herein, bypassing the transmissions 28, 30 involves actuating levers on the transmissions 28, 30 that engage and disengage a bypass function built into the transmissions. The present invention is not so limited, however, and other methods of bypassing a transmission are within the ambit of the invention, including disengaging a drive belt.

With particular reference to FIGS. 4-9, the brake and transmission bypass control assembly 36 is illustrated. The assembly 36 includes a manually-moveable brake lever 38 for selectively braking the drive wheels 18, 20, a manually-moveable bypass lever 40 for selectively engaging the bypass functions of the transmissions 28, 30, and a push-pull cable control system 42 operably coupling the brake lever 38 and the bypass lever 40 with the transmissions 28, 30 for actuating braking and bypass functions of the transmissions 28, 30.

The brake lever 38 is generally L-shaped with a handle portion 44 and a leg portion 46. The lever 38 is pivotably connected to a bracket 48 that is fixedly connected to the chassis 12 and is pivotable between an engaged position (FIGS. 8-9) and a disengaged position (FIGS. 4-7). A manually-moveable locking mechanism 50 retains the brake lever 38 in the engaged position. More particularly, the locking mechanism 50 includes a handle portion 52 and a lock portion 54 and is pivotally attached to the handle portion 44 of the brake lever 38. When the brake lever 38 is moved from the disengaged position to the engaged position, a notch 56 in the lock portion 54 of the locking mechanism 50 engages a fixed lock bar 58 positioned above the brake and transmission bypass levers 38, 40 to retain the brake lever 38 in the engaged position until the operator manually moves the handle portion 54 to release the mechanism 52 from the bar 58.

The handle portion 44 of the brake lever 38 may be between about six inches and eighteen inches in length, and may particularly be about ten inches, about twelve inches or about fourteen inches long. The leg portion 46 of the brake lever 38 may be between about one inch long and about six inches long, and may particularly be about two inches, about three inches or about four inches long. While the leg portion 46 is illustrated as being substantially normal to the handle portion 44, it will be appreciated that the leg 46 and the handle 44 portions may be separated by virtually any angle, including angles within the range of from about thirty degrees to about one hundred fifty degrees.

The brake lever 38 includes a bolt 60 or similar structural element extending laterally to engage the transmission bypass lever 40 such that moving the brake lever 38 from the disengaged position to the engaged position forces the bypass lever 40 to also move from the disengaged position (FIGS. 4-5) to the engaged position (FIGS. 6-9). With this configuration, the operator may simultaneously engaged the brake lever 38 and the bypass lever 40 by simply shifting the brake lever 38 to the engaged position.

The bypass lever 40 includes a handle portion 62, a leg portion 64 and a locking mechanism 66 that are similar or identical to the handle portion 44, the leg portion 46 and the locking mechanism 50 of the brake lever 38 described above, except that the leg portion 64 of the bypass lever 40 includes a notch 68 or other structural element for engaging the bolt 60 of the brake lever 38 when the brake lever 38 is moved to the engaged position to thereby force the bypass lever 40 into the engaged position as well.

A pair of extension springs 70, 72 attached to the locking mechanisms 50, 66 and to the levers 38, 40 bias the locking mechanisms 50, 66 in a locked position so that once the locking mechanisms 50, 66 engage the lock bar 58, the operator must manually push downward on the handle portions of the locking mechanisms 50, 66 to release them from the lock bar 58.

To use the mower 10, an operator seats himself in the seat 14 and places his forearms on the armrests or to his sides if no armrests are provided. Because the control handles 32, 34 are positioned outboard of the seat and extend upwardly and not horizontally toward the seat, the operator can quickly and easily enter or exit the seat with no interference from the control handles 32, 34.

Figure 6:
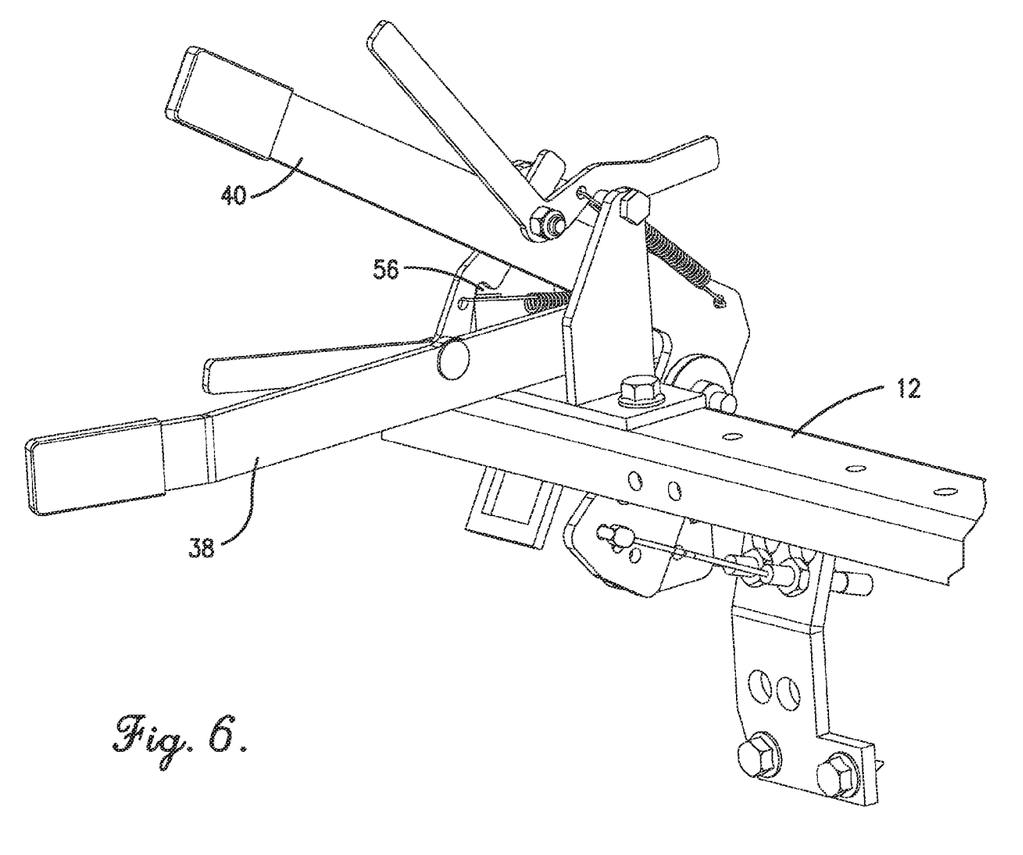
FIG. 6 is a front isometric view of the brake lever and the bypass lever illustrating the bypass lever in an engaged position and the brake lever in an unengaged position.
Figure 7:
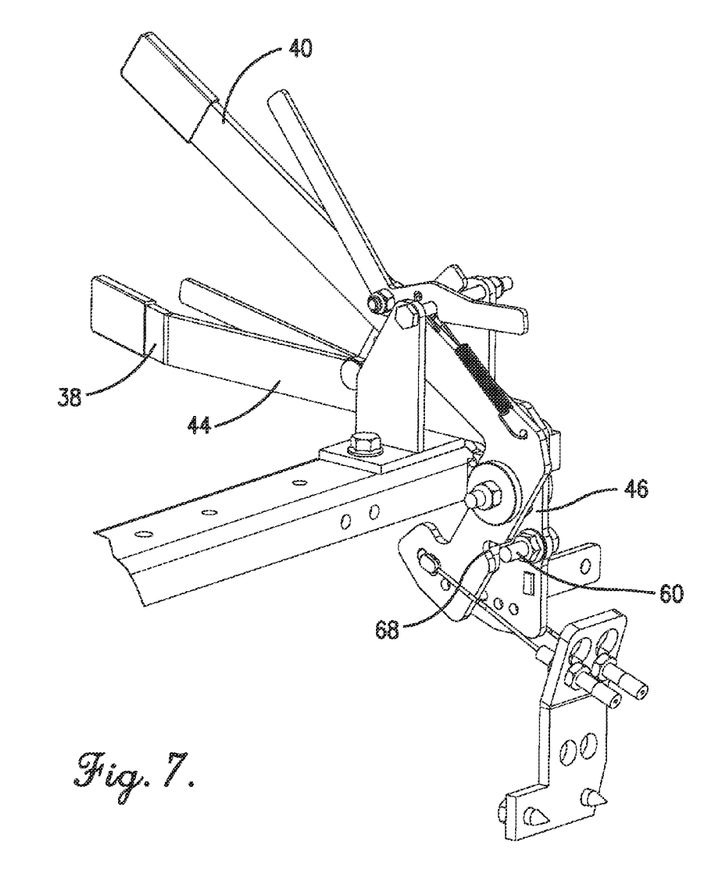
FIG. 7 is a rear isometric view of the brake lever and the bypass lever illustrating the bypass lever in an engaged position and the brake lever in an unengaged position.
Figure 8:
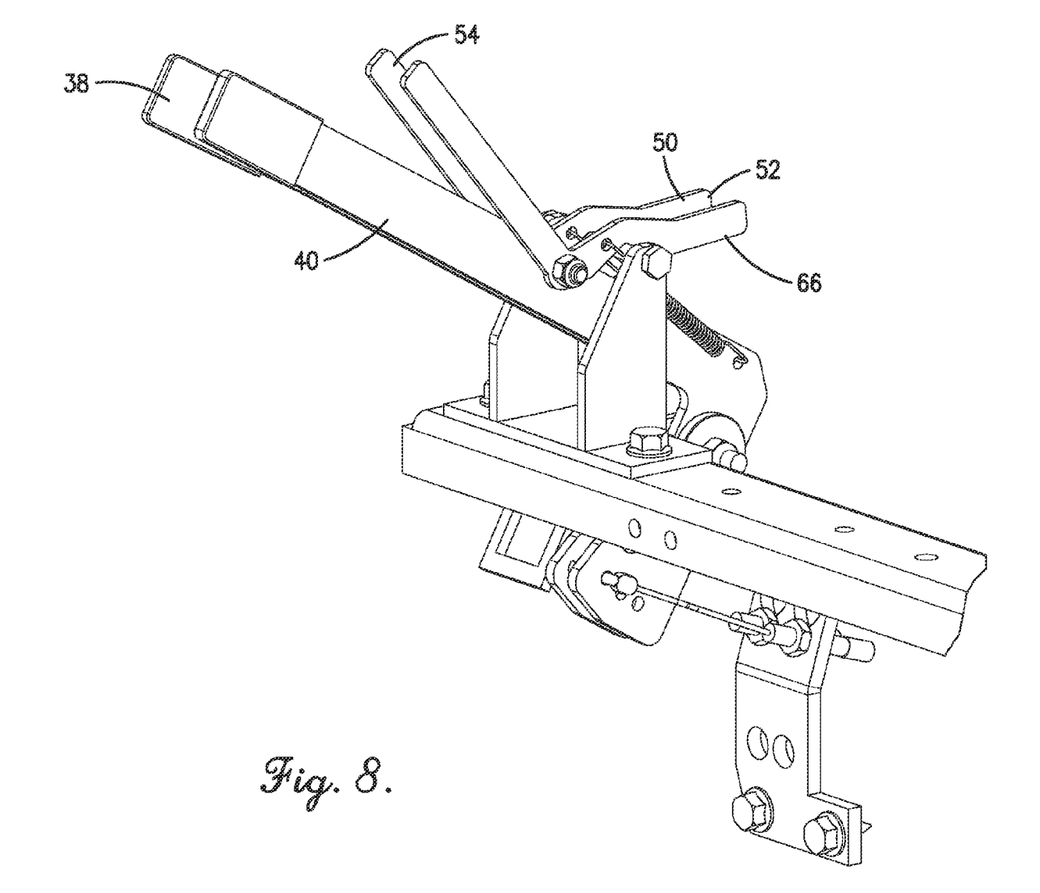
FIG. 8 is a front isometric view of the brake lever and the bypass lever illustrating both levers in an engaged position.
Figure 9:
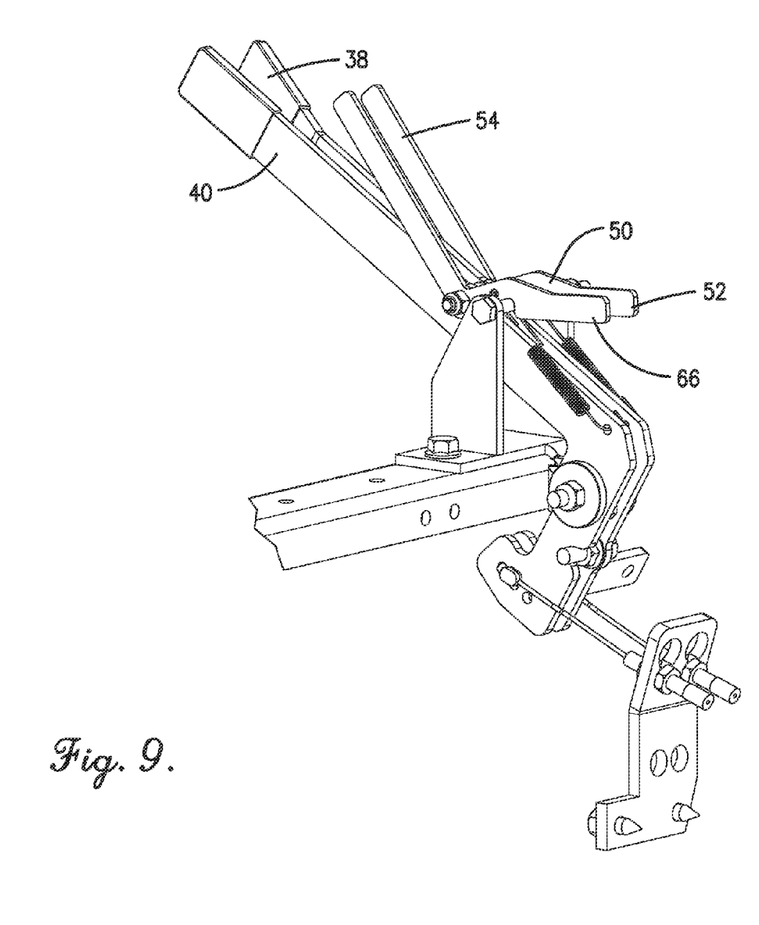
FIG. 9 is a rear isometric view of the brake lever and the bypass lever illustrating both levers in an engaged position.

The operator then starts the mower in a conventional manner and moves the two handles 32, 34 back and forth to control the direction and speed of the mower. To brake the drive wheels 18, 20, the operator pulls the brake lever 38 upward from the disengaged position to the engaged position. The bypass lever 40 will follow the movement of the brake lever 38, as explained above, and both locking mechanisms 50, 66 will engage the lock boar 58 to fix the levers 38, 40 in the engaged position, as illustrated in FIGS. 8-9. To bypass the transmissions 28, 30, the operator pulls the bypass lever 40 upward from the disengaged position to the engaged position, wherein the bypass locking mechanism 66 engages the lock bar 58 and fixes the bypass lever 40 in the engaged position while the brake lever 38 remains in the disengaged position, as illustrated in FIGS. 6-7. Thus, the brake and bypass control assembly 36 allows the operator to bypass the transmissions without braking the drive wheels so that drives wheels 18, 20 spin freely and the mower 10 can be rolled.

The push-pull cable system 42 operably couples the leg portion 46 of the brake lever 38 to a lever on each of the transmissions 28, 30 that actuates a braking mechanism built into the transmissions 28, 30. Similarly, push-pull cable system 42 operably couples the leg portion 64 of the bypass lever 40 to a lever on each of the transmissions 28, 30 that actuates a bypass mechanism built into the transmissions 28, 30.

Although the invention has been described with reference to the preferred embodiment illustrated in the attached drawing figures, it is noted that equivalents may be employed and substitutions made herein without departing from the scope of the invention as recited in the claims. By way of example, the particular size, shape and placement of the brake lever and the bypass lever is not critical to the present invention and may vary from one embodiment to another. Furthermore, while the brake lever 38 engages a braking function of the transmissions 28, 30 in the embodiment described herein, in other embodiments of the invention the brake lever 38 may engage a brake that directly contacts the drive wheels.

Having thus described the preferred embodiment of the invention, what is claimed as new and desired to be protected by Letters Patent includes the following:

1. A vehicle comprising:
   a chassis;
   a number of wheels for supporting the chassis above a ground surface, the wheels including at least one drive wheel;
   an engine and a drive mechanism for driving the at least one drive wheel;
   a brake lever for selectively braking one of the wheels; and
   a bypass lever for selectively bypassing the drive mechanism,
   the brake lever and the bypass lever being configured such that engaging the brake lever causes the bypass lever to be engaged.

2. The vehicle of claim 1, the brake lever and the bypass lever being configured such that engaging the bypass lever does not cause the brake lever to be engaged.

3. The vehicle of claim 1, the brake lever including a manually-operated locking element for automatically locking the brake lever into an engaged position and selectively releasing the brake lever from the engaged position.

4. The vehicle of claim 1, the bypass lever including a manually-operated locking element for automatically locking the bypass lever into an engaged position and selectively releasing the bypass lever from the engaged position.

5. The vehicle of claim 1, further comprising a seat supported by the chassis.

6. The vehicle of claim 5, the bypass lever and the brake lever being positioned proximate the seat such that an operator can reach and operate the levers while seated in the seat.

7. The vehicle of claim 1, the brake lever being connected to a braking mechanism via a push-pull control cable.

8. The vehicle of claim 1, the bypass lever being connected to a bypass mechanism via a push-pull control cable.

9. The vehicle of claim 1, wherein the at least one drive wheel includes a first drive wheel and a second drive wheel, the vehicle further comprising a first manually-moveable control handle for controlling the first drive wheel and a second manually-moveable control handle for controlling the second drive wheel.

10. The vehicle of claim 9, each of the control handles extending upwardly and being mounted outboard of opposite sides of a seat so as not to block an operator's ingress or egress from the seat.

11. The vehicle of claim 1, the brake lever and the bypass lever being mechanically coupled such that engaging the brake lever forces the bypass lever to be engaged simultaneously with the brake lever.

12. The vehicle of claim 1, the brake lever and the bypass lever each including a handle portion and a leg portion separated by an angle of between 30 and 150 degrees, the leg portion of the brake lever including a locking element that engages the leg portion of the bypass lever to thereby cause the bypass lever to be engaged when the brake lever is engaged.

13. The vehicle of claim 1, the brake lever and the bypass lever being positioned within two inches of one another and moving in parallel, co-extensive paths of motion.

14. A transmission bypass system comprising:
   a manually-moveable brake lever for selectively braking a drive wheel on a vehicle;
   a manually-moveable bypass lever for selectively engaging bypass functions of a transmission of the vehicle, the brake lever and the bypass lever being mechanically coupled such that engaging the brake lever forces the bypass lever to be engaged with the brake lever, but engaging the bypass lever does not force the brake lever to be engaged.

15. The transmission bypass system of claim 14, the brake lever including a manually-moveable locking mechanism for automatically locking the brake lever in an engaged position and selectively releasing the brake lever from the engaged position.

16. The transmission bypass system of claim 14, the bypass lever including a manually-moveable locking mechanism for automatically locking the bypass lever in an engaged position and selectively releasing the bypass lever from the engaged position.

17. The transmission bypass system of claim 14, the brake lever and the bypass lever each including a forwardly-extending handle portion and a downwardly-extending leg portion and being configured to pivot about a point proximate an intersection of the handle portion and the leg portion, the leg portion of the brake lever including a locking element that engages the leg portion of the bypass lever to thereby cause the bypass lever to be engaged when the brake lever is engaged.

18. The transmission bypass system of claim 17, the leg portion of the brake lever being configured to be connected to a braking mechanism on the transmission via a push-pull control cable.

19. The transmission bypass system of claim 17, the leg portion of the bypass lever being configured to be connected to a transmission bypass mechanism on the transmission via a push-pull control cable.

* * * * *